(12) United States Patent
Shuster

(10) Patent No.: US 10,235,442 B2
(45) Date of Patent: Mar. 19, 2019

(54) METHOD AND APPARATUS FOR IDENTIFYING AND CHARACTERIZING ERRANT ELECTRONIC FILES

(71) Applicant: Intellectual Ventures I LLC, Wilmington, DE (US)

(72) Inventor: Gary Stephen Shuster, Fresno, CA (US)

(73) Assignee: INTELLECTUAL VENTURES I LLC, Wilmington, DE (US)

( * ) Notice: Subject to any disclaimer, the term of this patent is extended or adjusted under 35 U.S.C. 154(b) by 101 days.

(21) Appl. No.: 14/997,981

(22) Filed: Jan. 18, 2016

(65) Prior Publication Data
US 2016/0217199 A1   Jul. 28, 2016

Related U.S. Application Data

(60) Continuation of application No. 13/602,238, filed on Sep. 3, 2012, now Pat. No. 9,239,924, which is a
(Continued)

(51) Int. Cl.
*G06F 21/00* (2013.01)
*H04L 29/06* (2006.01)
(Continued)

(52) U.S. Cl.
CPC .. *G06F 17/30598* (2013.01); *G06F 17/30082* (2013.01); *G06F 17/30106* (2013.01);
(Continued)

(58) Field of Classification Search
CPC ............... G06F 21/564; G06F 21/6218; G06F 2221/2149
See application file for complete search history.

(56) References Cited

U.S. PATENT DOCUMENTS

| 4,864,616 A | 9/1989 | Pond et al. |
| 5,065,314 A | 11/1991 | Maskovyak |

(Continued)

FOREIGN PATENT DOCUMENTS

| WO | WO 98/25373 | 6/1998 |
| WO | WO 98/42098 | 9/1998 |

OTHER PUBLICATIONS

Petition for Covered Business Method '298 Patent, Exhibit/Paper No. 2, filed Nov. 12, 2013, in CBM2014-00032, in 60 pages.
(Continued)

*Primary Examiner* — Lisa C Lewis
(74) *Attorney, Agent, or Firm* — Knobbe, Martens, Olson & Bear, LLP

(57) ABSTRACT

A computer system includes a server having a memory connected thereto. The server is adapted to be connected to a network to permit remote storage and retrieval of data files from the memory. A file identification application is operative with the server to identify errant files stored in the memory. The file identification application provides the functions of: (1) selecting a file stored in said memory; (2) generating a unique checksum corresponding to the stored fire; (3) comparing said unique checksum to each of a plurality of previously generated checksums, wherein the plurality of previously generated checksums correspond to known errant files; and (4) marking the file for deletion from the memory if the unique checksum matches one of the plurality of previously generated checksums.

19 Claims, 6 Drawing Sheets

Related U.S. Application Data continuation of application No. 12/834,797, filed on Jul. 12, 2010, now Pat. No. 8,261,366, which is a division of application No. 11/145,125, filed on Jun. 3, 2005, now Pat. No. 7,757,298, which is a continuation of application No. 09/561,751, filed on Apr. 29, 2000, now Pat. No. 6,922,781.

(60) Provisional application No. 60/157,195, filed on Sep. 30, 1999, provisional application No. 60/142,332, filed on Jul. 3, 1999, provisional application No. 60/132,093, filed on Apr. 30, 1999.

(51) Int. Cl.
  *G06F 17/30* (2006.01)
  *G06F 21/56* (2013.01)
  *G06F 21/62* (2013.01)

(52) U.S. Cl.
  CPC ........ *G06F 21/564* (2013.01); *G06F 21/6218* (2013.01); *G06F 2221/2149* (2013.01)

(56) References Cited

U.S. PATENT DOCUMENTS

| | | | |
|---|---|---|---|
| 5,500,864 | A | 3/1996 | Gonia et al. |
| 5,519,865 | A | 5/1996 | Kondo et al. |
| 5,530,757 | A | 6/1996 | Krawczyk |
| 5,651,064 | A | 7/1997 | Newell |
| 5,809,138 | A | 9/1998 | Netiv |
| 5,832,208 | A | 11/1998 | Chen et al. |
| 5,835,722 | A | 11/1998 | Bradshaw et al. |
| 5,848,418 | A | 12/1998 | De Souza et al. |
| 5,889,943 | A | 3/1999 | Ji et al. |
| 5,905,800 | A | 5/1999 | Moskowitz et al. |
| 5,951,698 | A | 9/1999 | Chen et al. |
| 5,960,170 | A | 9/1999 | Chen et al. |
| 5,978,791 | A | 11/1999 | Farber et al. |
| 5,983,351 | A | 11/1999 | Glogau |
| 5,996,113 | A | 11/1999 | Korn et al. |
| 6,035,423 | A | 3/2000 | Hodges et al. |
| 6,047,103 | A | 4/2000 | Yamauchi et al. |
| 6,081,897 | A | 6/2000 | Bersson |
| 6,108,799 | A | 8/2000 | Boulay et al. |
| 6,118,893 | A | 9/2000 | Li |
| 6,167,137 | A | 12/2000 | Marino et al. |
| 6,182,081 | B1 | 1/2001 | Dietl et al. |
| 6,209,097 | B1 | 3/2001 | Nakayama et al. |
| 6,219,818 | B1 | 4/2001 | Freivald et al. |
| 6,236,768 | B1 | 5/2001 | Rhodes et al. |
| 6,289,341 | B1 | 9/2001 | Barney |
| 6,510,513 | B1 | 1/2003 | Danieli |
| 6,530,022 | B1 | 3/2003 | Blair et al. |
| 6,577,920 | B1 | 6/2003 | Hypponen et al. |
| 6,643,696 | B2 | 11/2003 | Davis et al. |
| 6,922,781 | B1 | 7/2005 | Shuster |
| 7,120,274 | B2 | 10/2006 | Kacker et al. |
| 7,757,298 | B2 | 7/2010 | Shuster |
| RE44,131 | E | 4/2013 | Togawa et al. |
| 8,504,517 | B2* | 8/2013 | Agrawal ........... G06F 17/30578 707/610 |
| 2002/0087885 | A1 | 7/2002 | Peled et al. |
| 2005/0108248 | A1 | 5/2005 | Natunen |

OTHER PUBLICATIONS

Certificate of Service, Exhibit/Paper No. 4, filed Nov. 12, 2013, in CBM2014-00032, in 1 page.
Power of Attorney, Exhibit/Paper No. 5, filed Nov. 12, 2013, in CBM2014-00032, in 2 pages.
Notice of Filing Date Accorded, Exhibit/Paper No. 6, filed Nov. 25, 2013, in CBM2014-00032, in 4 pages.
Power of Attorney, Exhibit/Paper No. 7, filed Dec. 3, 2013, in CBM2014-00032, in 4 pages.
Patent Owner Submission of Mandatory Notice Information Pursuant to 37 CFR 42.8(a), Exhibit/Paper No. 8, filed Dec. 4, 2013, in CBM2014-00032, in 4 pages.
Order—Denial of Authorization to File Motion for Time Extension, Exhibit/Paper No. 9, filed Feb. 11, 2014, in CBM2014-00032, in 5 pages.
Transcript of Proceedings Feb. 7, 2014, Exhibit/Paper No. 10, filed Feb. 14, 2014, in CBM2014-00032, in 20 pages.
Patent Owner's Preliminary Response to Petition for Covered Business Method Review, Exhibit/Paper No. 11, filed Feb. 26, 2014, in CBM2014-00032, in 66 pages.
Patent Owner's Exhibit List, Exhibit/Paper No. 12, filed Feb. 26, 2014, in CBM2014-00032, in 3 pages.
Decision—Denying Institution of Covered Business Method Patent Review, Exhibit/Paper No. 13, filed May 22, 2014, in CBM2014-00032, in 15 pages.
U.S. Pat. No. 7,757,298, Exhibit No. 1001, filed Nov. 12, 2013, in CBM2014-00032, in 15 pages.
Federal Register, Exhibit No. 1002, filed Nov. 12, 2013, in CBM2014-00032, in 19 pages.
Guide Legislative History, Exhibit No. 1003, filed Nov. 12, 2013, in CBM2014-00032, in 115 pages.
Congressional Record, Exhibit No. 1004, filed Nov. 12, 2013, in CBM2014-00032, in 35 pages.
Declaration Seshan, Exhibit No. 1005, filed Nov. 12, 2013, in CBM2014-00032, in 28 pages.
Complaint, Exhibit No. 1006, filed Nov. 12, 2013, in CBM2014-00032, in 14 pages.
Infringement Contentions, Exhibit No. 1007, filed Nov. 12, 2013, in CBM2014-00032, in 434 pages.
Preliminary Amendment, Exhibit No. 1008, filed Nov. 12, 2013, in CBM2014-00032, in 8 pages.
Office Action, Exhibit No. 1009, filed Nov. 12, 2013, in CBM2014-00032, in 14 pages.
Response Office Action, Exhibit No. 1010, filed Nov. 12, 2013, in CBM2014-00032, in 21 pages.
Seshan CV, Exhibit No. 1011, filed Nov. 12, 2013, in CBM2014-00032, in 18 pages.
Exhibit, Exhibit No. 2001, filed Feb. 26, 2014, in CBM2014-00032, in 21 pages.
Exhibit, Exhibit No. 2002, filed Feb. 26, 2014, in CBM2014-00032, in 42 pages.
Exhibit, Exhibit No. 2003, filed Feb. 26, 2014, in CBM2014-00032, in 26 pages.
Petition for Inter Partes Review Under 35 U.S.C. Section 311 and 37, Exhibit/Paper No. 1, filed Sep. 17, 2014, in IPR2014-01516, in 65 pages.
Power of Attorney, Exhibit/Paper No. 2, filed Sep. 17, 2014, in IPR2014-01516, in 3 pages.
Patent Owner Submission of Mandatory Notice Information Pursuant to 37 CFR 42.8(a), Exhibit/Paper No. 4, filed Oct. 8, 2014, in IPR2014-01516, in 5 pages.
Declaration of Richard Kemmerer, Exhibit/Paper No. 1001, filed Sep. 17, 2014, in IPR2014-01516, in 78 pages.
Kemmerer CV, Exhibit/Paper No. 1002, filed Sep. 17, 2014, in IPR2014-01516, in 25 pages.
Declaration of Joel Merkin, Exhibit/Paper No. 1003, filed Sep. 17, 2014, in IPR2014-01516, in 4 pages.
U.S. Pat. No. 7,757,298, Exhibit/Paper No. 1004, filed Sep. 17, 2014, in IPR2014-01516, in 15 pages.
U.S. Pat. No. 5,951,698, Exhibit/Paper No. 1005, filed Sep. 17, 2014, in IPR2014-01516, in 21 pages.
U.S. Pat. No. 5,889,943, Exhibit/Paper No. 1006, filed Sep. 17, 2014, in IPR2014-01516, in 40 pages.
U.S. Pat. No. 5,996,113, Exhibit/Paper No. 1007, filed Sep. 17, 2014, in IPR2014-01516, in 17 pages.
Kim, et. at., The Design and Implementation of Tripwire, Exhibit/Paper No. 1008, filed Sep. 17, 2014, in IPR2014-01516, in 12 pages.
U.S. Pat. No. 5,848,418, Exhibit/Paper No. 1009, filed Sep. 17, 2014, in IPR2014-01516, in 16 pages.

(56) References Cited

OTHER PUBLICATIONS

U.S. Pat. No. 5,978,791, Exhibit/Paper No. 1010, filed Sep. 17, 2014, in IPR2014-01516, in 56 pages.
Aug. 28, 2009 Amendment, Exhibit/Paper No. 1011, filed Sep. 17, 2014, in IPR2014-01516, in 21 pages.
Apr. 2, 2009 Non-Final Rejection, Exhibit/Paper No. 1012, filed Sep. 17, 2014, in IPR2014-01516, in 14 pages.
Jan. 11, 2010 Amendment, Exhibit/Paper No. 1013, filed Sep. 17, 2014, in IPR2014-01516, in 10 pages.
Mar. 2, 2010 Notice of Allowance, Exhibit/Paper No. 1014, filed Sep. 17, 2014, in IPR2014-01516, in 7 pages.
USPTO Assignments on the Web (U.S. Pat. No. 6,922,781), Exhibit/Paper No. 1015, filed Sep. 17, 2014, in IPR2014-01516, in 1 page.
USPTO Assignments on the Web (U.S. Pat. No. 7,757,298), Exhibit/Paper No. 1016, filed Sep. 17, 2014, in IPR2014-01516, in 2 pages.
Jun. 3, 2005 Preliminary Amendment, Exhibit/Paper No. 1017, filed Sep. 17, 2014, in IPR2014-01516, in 8 pages.
IV I Preliminary Response, Exhibit/Paper No. 5, filed Jan. 5, 2015, in IPR2014-01516, in 53 pages.
Petitioner's Amended Appendix of Exhibits, Exhibit/Paper No. 6, filed Feb. 9, 2015, in IPR2014-01516, in 4 pages.
Transcript of the Jan. 28, 2015 Conference Call, Exhibit/Paper No. 1018, filed Feb. 9, 2015, in IPR2014-01516, in 15 pages.
Decision Denying Institution of Inter Partes Review, Exhibit/Paper No. 7, filed Mar. 30, 2015, in IPR2014-01516, in 20 pages.
Petitioner's Request for Rehearing Pursuant to 37 C.F.R. §§ 42.71(c) and (d), Paper No. 8, filed Apr. 29, 2015, in IPR2014-01516, in 18 pages.
Decision Denying Request for Rehearing, Paper No. 9, dated Aug. 24, 2015, in IPR2014-01516, in 12 pages.
Hopkins, "Sample Size on the Fly" from Internet Archive WayBack Machine, Feb. 11, 1988. https://web.archive.org/web/19980211195936/http:www.sportsci.org/resource/stats/ssonthefly.html, pp. 1-2.
Ton Kalker et al., "Music2Share—Copyright-Compliant Music Sharing in P2P Systems," Proceedings of the IEEE, vol. 92, No. 6, Jun. 2004, pp. 961-970.
Office Action in U.S. Appl. No. 12/834,797 dated Feb. 8, 2012, 6 pages.
Response to Office Action in U.S. Appl. No. 12/834,797 dated Feb. 8, 2012, dated Apr. 11, 2012, 8 pages.
Notice of Filing Date Accorded to Petition, Exhibit/Paper No. 3, filed Oct. 3, 2014, in IPR2014-01516, in 3 pages.
United States Patent and Trademark Office; Before the Patent Trial and Appeal Board; *Symantec Corporation,* Petitioner v. *Intellectual Ventures I LLC,* Patent Owner; Case: to Be Assigned; U.S. Pat. No. 7,757,298; Petition for Inter Partes Review Pursuant to 37 C.F.R. §42.100 et seq.; Date: Jul. 14; 2016, 74 pages.
United States Patent and Trademark Office; Before the Patent Trial and Appeal Board; *Symantec Corporation,* Petitioner v. *Intellectual Ventures I LLC,* Patent Owner; Case No. IPR2016-01433; U.S. Pat. No. 7,757,298; Patent Owner's Preliminary Response; Filed: Oct. 21, 2016; 28 pages.
United States Patent and Trademark Office; Before the Patent Trial and Appeal Board; *Symantec Corporation,* Petitioner v. *Intellectual Ventures I LLC,* Patent Owner; Case IPR2016-01433; U.S. Pat. No. 7,757,298 B2; Decision; Institution of Inter Partes Review; 37 C.F.R. §42.108; Paper No. 6; Entered: Jan. 18, 2017; 29 pages.
United States Patent and Trademark Office; Before the Patent Trial and Appeal Board; *Symantec Corporation,* Petitioner v. *Intellectual Ventures I LLC,* Patent Owner; Case No. IPR2016-01433; U.S. Pat. No. 7,757,298; Patent Owner's Response; Filed: Apr. 18, 207; 53 pages.
United States Patent and Trademark Office; Before the Patent Trial and Appeal Board; *Symantec Corporation,* Petitioner v. *Intellectual Ventures I LLC,* Patent Owner; Case: IPR2016-01433; U.S. Pat. No. 7,757,298 ; Petitioners' Reply to Patent Owner's Response; Date: Jul. 20, 2017; 33 pages.
*Symantec Corporation* v. *Intellectual Ventures I LLC,* Case: IPR2016-01433; U.S. Pat. No. 7,757,298; Petitioner Symantec Corporation's Demonstratives; Hearing: Oct. 12, 2017; 45 pages.
*Symantec Corporation* v. *Intellectual Ventures I LLC,* IPR2016-01433; U.S. Pat. No. 7,757,298; Intellectual Ventures' Demonstratives for Oral Hearing; Oct. 12, 2017; served electronically on Oct. 6, 2017; 67 pages.
United States Patent and Trademark Office; Before the Patent Trial and Appeal Board; *Symantec Corporation,* Petitioner v. *Intellectual Ventures I LLC,* Patent Owner; Case IPR2016-01433; U.S. Pat. No. 7,757,298 B2; Record of Oral Hearing; Held: Oct. 12, 2017; 40 pages.
United States Patent and Trademark Office; Before the Patent Trial and Appeal Board; *Symantec Corporation,* Petitioner v. *Intellectual Ventures I LLC,* Patent Owner; Case IPR2016-01433; U.S. Pat. No. 7,757,298 B2; Decision; 35 U.S.C. § 318(a) and 37 C.F.R, §42.73; Paper No. 25; Entered: Jan. 5, 2018; 37 pages.
Intellectual Ventures Exhibit 2001; *Symantec Corp.* v. *Intellectual Ventures I LLC;* IPR2016-01433; New Collegiate Dictionary © 1973: *Definition of Part and Portion;* pp. 835, 896-897; 5 pages.
Intellectual Ventures Exhibit 2002; *Symantec Corp.* v. *Intellectual Ventures I LLC;* IPR2016-01433; Document 66-1; Filed Apr. 4, 2016; 4 pages; Exhibit "A", Agreed Constructions.
Intellectual Ventures Exhibit 2003; *Symantec Corp.* v. *Intellectual Ventures I LLC;* IPR2016-01433; Document 75; Filed May 4, 2016; 33 pages: In The United States District Court for the Eastern District of Texas; Tyler Division; Civil Action No. 6:15-CV-660-JRG; Jury Trial Demanded; Plaintiff Intellectual Ventures I LLC and Intellectual Ventures II LLC's Opening Claim Construction Brief.
Intellectual Ventures Exhibit 2004; *Symantec Corp.* v. *Intellectual Ventures I LLC;* IPR2016-01433; Document 79; Filed May 25, 2016; 13 pages; In The United States District Court for the Eastern District of Texas; Tyler Division; Civil Action No. 6:15-CV-660-JRG; Jury Trial Demanded; Plaintiffs Intellectual Ventures I LLC and Intellectual Ventures II LLC's Reply Claim Construction Brief.
Intellectual Ventures Exhibit 2005; *Symantec Corp.* v. *Intellectual Ventures I LLC;* IPR2016-01433; Document 80-1; Filed Jun. 1, 2016; 32 pages; Exhibit "A", Parties' Proposed Construction for Disputed Terms; Joint Claim Construction Chart Under Local Patent Rule 4-5(d).
Intellectual Ventures Exhibit 2006; *Symantec Corp.* v. *Intellectual Ventures I LLC;* IPR2016-01433; In The United States Patent and Trademark Office; Declaration of David M. Goldschlag, Ph.D.; Under 37 C.F.R.§ 1.68; 50 pages.
Intellectual Ventures Exhibit 2007; *Symantec Corp.* v. *Intellectual Ventures I LLC;* IPR2016-01433; Curriculum Vitae of David Moshe Goldschlag, PhD.; 5 pages.
Intellectual Ventures Exhibit 2008; *Symantec Corp.* v. *Intellectual Ventures I LLC;* IPR2016-01433; Merriam-Webster © 2017: *definition of unauthorized;* https://www.merriam-webster.com/dictionary/select[4/14/2017]; 12 pages.
Intellectual Ventures Exhibit 2009; *Symantec Corp.* v. *Intellectual Ventures I LLC;* IPR2016-01433; Merriam-Webster © 2017: *definition of select;* https://www.merriam-webster.com/dictionary/unauthorized[4/14/2017]; 6 pages.
Intellectual Ventures Exhibit 2010; *Symantec Corp.* v. *Intellectual Ventures I LLC;* IPR2016-01433; Videotaped Deposition of Jack Davidson; Wednesday, Apr. 5, 2017; 10:00 a.m.; 109 pages.
Intellectual Ventures Exhibit 2011; *Symantec Corp.* v. *Intellectual Ventures I LLC;* IPR2016-01433; Case: 17-1147; Document 20; Filed: Jan. 17, 2017 United States Court of Appeals for the Federal Circuit; Brief for Appellants; 90 pages.
Intellectual Ventures Exhibit 2012; *Symantec Corp.* v. *Intellectual Ventures I LLC;* IPR2016-01433; Case: 17-1147; Document 28; Filed: Mar. 20, 2017 United States Court of Appeals for the Federal Circuit; Brief for Defendants-Appellees; 70 pages.
Intellectual Ventures Exhibit 2013; *Symantec Corp.* v. *Intellectual Ventures I LLC;* IPR2016-01433; Case: 17-1147; Document 31; Filed: Apr. 3, 2017 United States Court of Appeals for the Federal Circuit; Reply Brief for Appellants; 29 pages.
Symantec Exhibit 1001; IPR of U.S. Pat. No. 7,757,298; U.S. Pat. No. 7,757,298 B2, Issue Date: Jul. 13, 2010, Inventor: Shuster, Gary Stephen, 15 pages.
Symantec Exhibit 1002; IPR of U.S. Pat. No. 7,757,298; U.S. Pat. No. 5,848,418, Issue Date: Dec. 8, 1998, Inventors: Souza et al., 16 pages.

(56) References Cited

OTHER PUBLICATIONS

Symantec Exhibit 1003; IPR of U.S. Pat. No. 7,757,298; U.S. Pat. No. 6,577,920 B1, Issue Date: Jun. 10, 2003, Inventors: Hyppönen et al., 8 pages.
Symantec Exhibit 1004; IPR of U.S. Pat. No. 7,757,298; Gord K. Hama, P. Eng., Royal Canadian Mounted Police; Mark M. Pollitt, Federal Bureau of Investigation, "Data Reduction—Refining the Sieve," Not Dated, 8 pages.
Symantec Exhibit 1005; IPR of U.S. Pat. No. 7,757,298; U.S. Pat. No. 6,122,657, Issue Date: Sep. 19, 2000, Inventors: Hoffman, Jr. et al., 22 pages.
Symantec Exhibit 1006; IPR of U.S. Pat. No. 7,757,298; Alan Johnson, "Steganography for DOS Programmers," Dr. Dobb's Journal, Jan. 1997, pp. 48-51.
Symantec Exhibit 1007; IPR of U.S. Pat. No. 7,757,298; U.S. Pat. No. 5,893,910, Issue Date: Apr. 13, 1999, Inventors: Martineau et al., 17 pages.
Symantec Exhibit 1008; IPR of U.S. Pat. No. 7,757,298; U.S. Pat. No. 5,696,822, Issue Date: Dec. 9, 1997, Inventor: Carey Nachenberg, 14 pages.
Symantec Exhibit 1009; IPR of U.S. Pat. No. 7,757,298; U.S. Pat. No. 5,978,791, Issue Date: Nov. 2, 1999, Inventor: Farber et al., 56 pages.
Symantec Exhibit 1010; IPR of U.S. Pat. No. 7,757,298; U.S. Pat. No. 5,649,205, Issue Date: Jul. 15, 1997, Inventor: Augusto Baronio Martins, 8 pages.
Symantec Exhibit 1011; IPR of U.S. Pat. No. 7,757,298; United States Patent and Trademark Office; Before the Patent Trial and Appeal Board; *Symantec Corporation,* Petitioner v. *Intellectual Ventures I LLC,* Patent Owner; Case: To Be Assigned; U.S. Pat. No. 7,757,298; Declaration of Jack W. Davidson in Support of Petitioner Pursuant to 37 C.F.R. § 42.120 et seq.; Executed on Jul. 13, 2016; 150 pages.
Symantec Exhibit 1012; IPR of U.S. Pat. No. 7,757,298; Curriculum Vitae of Jack W. Davidson, Updated: Feb. 7, 2016; 18 pages.
Symantec Exhibit 1013; IPR of U.S. Pat. No. 7,757,298; Ghosh et al., "A Secure and Robust Approach to Software Tamper Resistance," R. Böhme, P.W.L. Fong, and R. Safavi-Naini (Eds.): IH 2010, LNCS 6387, pp. 33-47, 2010.
Symantec Exhibit 1014; IPR of U.S. Pat. No. 7,757,298; Ghosh et al., "What's the PointISA?," Copyright 2014 ACM 978-1-4503-2647-6/14/06, 2006; pp. 23-34.
Symantec Exhibit 1015; IPR of U.S. Pat. No. 7,757,298; U.S. Pat. No. 6,122,738, Issue Date: Sep. 19, 2000, Inventor: John Millard, 7 pages.
Symantec Exhibit 1016; IPR of U.S. Pat. No. 7,757,298; U.S. Pat. No. 5,761,655, Issue Date: Jun. 2, 1998, Inventor: Michael T. Hoffman, 49 pages.
Symantec Exhibit 1017; IPR of U.S. Pat. No. 7,757,298; U.S. Pat. No. 6,101,507, Issue Date: Aug. 8, 2000, Inventors: Cane et al., 14 pages.
Symantec Exhibit 1018; IPR of U.S. Pat. No. 7,757,298; U.S. Pat. No. 6,230,288 B1, Issue Date: May 8, 2001, Inventors: Kuo et al., 8 pages.
Symantec Exhibit 1019; IPR of U.S. Pat. No. 7,757,298; U.S. Pat. No. 5,991,774, Issue Date: Nov. 23, 1999, Inventors: Tate et al., 10 pages.
Symantec Exhibit 1020; IPR of U.S. Pat. No. 7,757,298; U.S. Pat. No. 6,006,328, Issue Date: Dec. 21, 1999, Inventor: Christopher Nathan Drake, 19 pages.
Symantec Exhibit 1021; IPR of U.S. Pat. No. 7,757,298; U.S. Pat. No. 5,359,659, Issue Date: Oct. 25, 1994, Inventor: Doren Rosenthal, 17 pages.
Symantec Exhibit 1022; IPR of U.S. Pat. No. 7,757,298; U.S. Pat. No. 5,440,723, Issue Date: Aug. 8, 1995, Inventors: Arnold et al., 29 pages.
Symantec Exhibit 1023; IPR of U.S. Pat. No. 7,757,298; U.S. Pat. No. 5,684,875, Issue Date: Nov. 4, 1997, Inventor: Hans Ellenberger, 8 pages.
Symantec Exhibit 1024; IPR of U.S. Pat. No. 7,757,298; International Patent Publication No. WO 98/14872, Published Apr. 9, 1998, Applicant: Eva Y. Chen, 52 pages.
Symantec Exhibit 1025; IPR of U.S. Pat. No. 7,757,298; Kim et al., "The Design and Implementation of Tripwire: A File System Integrity Checker," COAST Laboratory, Department of Computer Sciences, Purdue University, West Lafayette, IN 47907-1398, © 1994 ACM 0-89791-732-4/94/0011, pp. 18-29.
Symantec Exhibit 1026; IPR of U.S. Pat. No. 7,757,298; File History: U.S. Appl. No. 11/145,125, filed Jun. 3, 2005, Inventor: Gary Stephen Shuster, 42 pages.
Symantec Exhibit 1027; IPR of U.S. Pat. No. 7,757,298; Exhibit "A"; Plaintiffs Intellectual Ventures' Proposed Claim Construction Pursuant to P. R. 4-2; 5 pages.
Symantec Exhibit 1028; IPR of U.S. Pat. No. 7,757,298; Udi Manber, "Finding Similar Files in a Large File System," TR 93-33, Oct. 1993, Department of Computer Science, The University of Arizona, Tucson, Arizona, 11 pages.
Symantec Exhibit 1029; IPR of U.S. Pat. No. 7,757,298; Email: From: Olin Interlibrary Services to: Cornell Library Annex Interlibrary Loan; ILL Request TN1287570; Tuesday, Jul. 12, 2016, 8 pages.
Symantec Exhibit 1030; IPR of U.S. Pat. No. 7,757,298; The New York Public Library, NYPL Interlibrary & Document Services, Affidavit of Maurice Klapwald; Jul. 6, 2016; 15 pages.
Symantec Exhibit 1031; IPR of U.S. Pat. No. 7,757,298; List of Reference Copies Requested; Not Dated, 3 pages.
Symantec Exhibit 1032; IPR of U.S. Pat. No. 7,757,298; Email: From: Wierzba, Christine, to: shieldslend@ucdavis.edu; Sent: Monday, Jul. 11, 2016 3:02PM; 11 pages.
Symantec Exhibit 1033; IPR of U.S. Pat. No. 7,757,298; United States Patent and Trademark Office; Before the Patent Trial and Appeal Board; *Symantec Corporation,* Petitioner v. *Intellectual Ventures I LLC,* Patent Owner; Case: To Be Assigned; U.S. Pat. No. 7,757,298; Declaration of Mark M. Pollitt, Ph.D., Executed on Jul. 13, 2016, 6 pages.
Symantec Exhibit 1034; IPR of U.S. Pat. No. 7,757,298; United States Patent and Trademark Office; Before the Patent Trial and Appeal Board; *Symantec Corp.,* Petitioner v. *Intellectual Ventures I LLC,* Patent Owner; Case: IPR2016-01433; U.S. Pat. No. 7,757,298; Affidavit of Alexander Walden, Executed, notarized on Jun. 15, 2017; 3 pages.
Symantec Exhibit 1035; IPR of U.S. Pat. No. 7,757,298; United States Patent and Trademark Office; Before the Patent Trial and Appeal Board; *Symantec Corporation,* Petitioner v. *Intellectual Ventures I LLC,* Patent Owner; Case No. IPR2016-01433; U.S. Pat. No. 7,757,298; Examination of: David M. Goldschlag, Ph.D.; Jun. 30, 2017; 33 pages.
Beebe, Nelson H. F., "A Bibliography of Publications in *Dr. Dobb's Journal: Software Tools for the Professional Programmer (1990-1999)*", http://www.math.utah.edu/~beebe/, Jun. 10, 2016, Version 3.14, 150 pages.
Affidavit of Pamela Stansbury, Administrative Supervisor in the Original Cataloging Unit, Cornell University Library, notarized on Feb. 7, 2017, 9 pages.
Declaration of Rachel J. Watters on Authentication of Publication, Librarian and Director of *Wisconsin TechSearch* ("*WTS*"), *University of Wisconsin-Madison*, Date: Feb. 7, 2017, 13 pages.
United States Patent and Trademark Office; Before the Patent Trial and Appeal Board; *Symantec Corporation,* Petitioner v. *Intellectual Ventures I LLC,* Patent Owner; Case: IPR2016-01433; U.S. Pat. No. 7,757,298; Declaration of Sylvia Hall-Ellis; Executed on Feb. 15, 2017, 16 pages; with Exhibit A—Curriculum Vitae, Sylvia D. Hall-Ellis, Updated Dec. 2016, 51 pages; total 67 pages.
United States Patent and Trademark Office; Before the Patent Trial and Appeal Board; *Symantec Corporation,* Petitioner, v. *Intellectual Ventures I LLC,* Patent Owner.; Case IPR2016-01433; U.S. Pat. No. 7,757,298; Decision; 35 U.S.C. § 318(a) and 37 C.F.R. § 42.73; Paper 25; Entered: Jan. 5, 2018; 37 pages.
Dr Dobbs Journal Index, "SoftCraft Magazine Resources," http://www.anpu.com/softcraft/pastver/anpu07/softcraft/m2/magres/drd.shtml, Feb. 15, 2017, 9 pages.

(56) References Cited

OTHER PUBLICATIONS

United States Court of Appeals for the Federal Circuit, *Intellectual Ventures I LLC, Intellectual Ventures II LLC,* Plaintiffs-Appellants, v. *Erie Indemnity Company, Erie Insurance Exchange, Erie Insurance Property & Casualty Company, Erie Insurance Company, Flagship City Insurance Company, Erie Family Life Insurance Company*, Defendants-Appellees; 2017-1147, Appeal from the United States District Court for the Western District of Pennsylvania in No. 1:14-cv-00220-MRH, Judge Mark R. Hornak; Decided: Nov. 3, 2017; 16 pages.

\* cited by examiner

METHOD AND APPARATUS FOR IDENTIFYING AND CHARACTERIZING ERRANT ELECTRONIC FILES

CROSS-REFERENCE TO RELATED APPLICATIONS

This application is a continuation of U.S. patent application Ser. No. 13/602,238, filed Sep. 3, 2012, now U.S. Pat. No. 9,239,924, which is a continuation of U.S. patent application Ser. No. 12/834,797, filed Jul. 12, 2010, now U.S. Pat. No. 8,261,366, which is a divisional of U.S. patent application Ser. No. 11/145,125, filed Jun. 3, 2005, now U.S. Pat. No. 7,757,298, which is a continuation of U.S. patent application Ser. No. 09/561,751, filed Apr. 29, 2000, now U.S. Pat. No. 6,922,781 and claims the benefit of U.S. Provisional Patent Application Nos. 60/132,093, filed Apr. 30, 1999; 60/142,332, filed Jul. 3, 1999; and 60/157,195, filed Sep. 30, 1999, each of which are hereby incorporated by reference in their entireties. Any and all applications, if any, for which a foreign or domestic priority claim is identified in the Application Data Sheet of the present application are hereby incorporated by reference under 37 CFR 1.57.

COPYRIGHT NOTICE

This patent document contains material subject to copyright protection. The copyright owner, Ideaflood, Inc., has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates to electronic files stored on computers, and more particularly, to methods and apparatus for identifying and characterizing errant electronic files stored on computer storage devices.

2. Description of the Related Art

The use of public and shared computing environments has proliferated due to the popularity of the Internet. Many Internet service providers (ISP) offer Web hosting services at low or no cost in which registered users can place their own Web sites on the ISP's servers. These individual Web sites allow users to store and access electronic files that are uploaded to the servers. As a result of this proliferation, the administration of the large number of stored electronic files has become an important aspect of such Web hosting services. In view of the relative ease of public access to these electronic file storage resources, there is also widespread abuse of Web server space in which users upload files that are offensive, illegal, unauthorized, or otherwise undesirable and thus wasteful of storage resources. These file types are predominantly of four types: music, video, software and graphics. Many such files may contain pornography in violation of the terms of use of the Web hosting service. Moreover, the copying of these files to the Web server may be in violation of U.S. copyright laws. Consequently, the identification and removal of such files represents a significant administrative burden to the Web hosting services. In addition, the presence of certain files (such as depictions of child pornography or copyrighted music files) on user computers on corporate networks poses great legal risks to the corporation.

Such files can be selected for review and characterized as acceptable or unacceptable to the system administrator using an automated or manual process. Unfortunately, many undesirable files are not easily recognizable and cannot be detected and characterized. A manual review of the content of the files stored on the storage resource is usually not economically feasible, and is also not entirely effective at identifying undesirable files. Illicit users of Web hosting services have devised numerous techniques for disguising improper files wherein even easily recognizable file types are disguised as less recognizable file types. One such technique for disguising files is to split them into parts so that (i) they cannot be detected by simple searches for large files, and (ii) they can be downloaded or uploaded in smaller chunks so that if a transfer is interrupted, the entire download or upload is not lost. The split files may also be renamed so as to hide their true file type. For example, a search for oversized music files (*.mp3) would not turn up a huge file named "song.txt" because it appears to the system as a text file.

Another technique for hiding files is to append them to files that legitimately belong on a web server. By way of example, a Website may be created called "Jane's Dog's Home Page." Jane gets ten small pictures of her dog, converts them to a computer readable format (for example, jpeg) and saves them on her computer. She then splits stolen, copyrighted software into ten parts. She appends each part to the end of one of the jpeg files. She then uploads these to a web server. Upon a manual review of the web page, the administrator of the site would not notice that the otherwise innocuous dog pictures actually contain stolen software, because each of the files would in fact display a photo of a dog. Thus, even if the files were reported for manual review by software doing a simple search for oversized files, the files would be left on the server because they appear to be legitimate. While these files can sometimes be identified by name or size alone, these methods lead to unacceptable numbers of false positives and false negatives as file sizes and names are changed.

Free and low cost web hosting services typically rely on advertising revenue to fund their operation. An additional abuse of these web hosting services is that they can be circumvented such that the advertisements are not displayed. Typically, the advertising content is displayed on text or hypertext pages. If a user stores graphics or other non-text files on a free web hosting server, yet creates a web page elsewhere on a different service that references these graphics or non-text files, the free web hosting service pays the storage and bandwidth costs for these files without deriving the revenue from advertisement displays.

A need exists, therefore, to provide a method and apparatus for identifying and characterizing errant electronic files stored on computer storage devices, that makes use of a variety of file attributes to reliably characterize files according to pre-set criteria, that is not easily circumvented, and that reduces the amount of manual review necessary to verify proper operation.

SUMMARY OF THE INVENTION

In accordance with the teachings of the present invention, a method and apparatus are provided for identifying and characterizing files electronically stored on a computer storage device. More particularly, an embodiment of the invention further comprises a computer system that includes a server having a memory connected thereto. The server is adapted to be connected to a network to permit remote storage and retrieval of data files from the memory. A file identification application is operative with the server to identify errant files stored in the memory. The file identification application provides the functions of: (1) selecting a file stored in said memory; (2) generating a unique checksum corresponding to the stored file; (3) comparing said unique checksum to each of a plurality of previously generated checksums, wherein the plurality of previously generated checksums correspond to known errant files; and (4) marking the file for deletion from the memory if the unique checksum matches one of the plurality of previously generated checksums.

A more complete understanding of the method and apparatus will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a method and apparatus for identifying and characterizing errant electronic files stored on computer storage devices, that makes use of a variety of file attributes to reliably characterize files according to pre-set criteria, that is not easily circumvented, and that reduces the amount of manual review necessary to verify proper operation. In the detailed description that follows, like element numerals are used to describe like elements illustrated in one or more of the figures.

Figure 1:
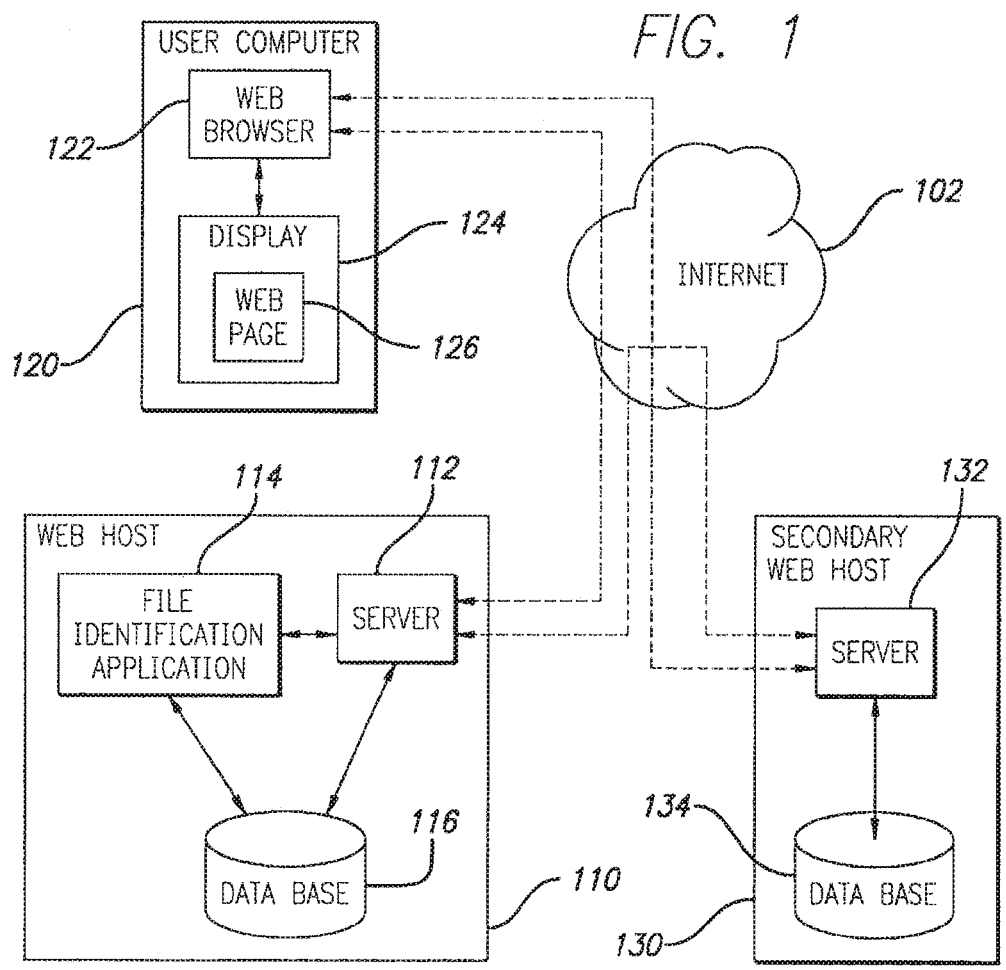
FIG. 1 is a block diagram illustrating a wide area network in which a web host delivers information in the form of web pages to users.

Referring first to FIG. 1, a block diagram is illustrated of a wide area network in which information is delivered to users in the form of web pages. It is anticipated that the present system operates with a plurality of computers that are coupled together on a communications network, such as the Internet or a wide area network. FIG. 1 depicts a network that includes a user computer 120 that communicates with a Web host 110 though communication links that include the Internet 102. The user computer 120 may be any type of computing device that allows a user to interactively browse websites, such as a personal computer (PC) that includes a Web browser application 122 executing thereon (e.g., Microsoft Internet Explorer™ or Netscape Communicator™). The Web host 110 includes a server 112 that can selectively deliver graphical data files in the form of HyperText Markup language (HTML) documents to the user computer 120 using the HyperText Transport Protocol (HTTP). Currently, HTML 2.0 is the standard used for generating Web documents, though it should be appreciated that other coding conventions could also be used within the scope of the present invention. The server 112 accesses HTML documents stored within a database 116 that can be requested retrieved and viewed at the user computer via operation of the Web browser 122. The database 116 may also contain many other types of files, including text, graphics, music, and software files. It should be appreciated that many different user computers may be communicating with the server 112 at the same time.

As generally known in the art, a user identifies a Web page that is desired to be viewed at the user computer 120 by communicating an HTTP request from the browser application 122. The HTTP request includes the Uniform Resource locator (URL) of the desired Web page, which may correspond to an HTML document stored on the database 116 of the Web host 110. The HTTP request is routed to the server 112 via the Internet 102. The server 112 then retrieves the HTML document identified by the URL, and communicates the HTML document across the Internet 102 to the browser application 122. The HTML document may be communicated in the form of plural message packets as defined by standard protocols, such as the Transport Control Protocol/Internet Protocol (TCP/IP). A user may also download any other type of file from the database 116 in the same manner.

FIG. 1 further illustrates a secondary Web host 130 having a server 132 and database 134 similar to that of the primary Web host 110. The user computer 120 can communicate with the secondary Web host 130 in the same manner as described above. Moreover, the primary Web host 110 can communicate with the secondary Web host 130 in the same manner. The pertinence of this communication path will become more clear from the following description of the present method. The Web host 110 further comprises a file identification application 114 that analyzes the data files stored on the database 116 in order to identify errant files in accordance with the present invention. The file identification application 114 may comprise a program executing on the same computer as the server 112, or may be executing on a separate computer. The file identification application tests various attributes of the files stored on the database to determine whether they satisfy a particular profile that corresponds to an errant file. Source code for a preferred embodiment of a file identification application is attached hereto as an exhibit.

A widely accepted characteristic of the Internet is that files are copied relentlessly and without permission. This is particularly true of illicit files, such as adult content, pornographic material or illegally copied software, music or graphics. Thus, a photograph showing up on a single Web site may be propagated to hundreds of other Web sites within days. Although the file name is often changed, and transmission errors often result in premature truncation of the file (and thus a new file length), the initial portion of the file remains identical as it is propagated throughout the Internet. Another characteristic of the Internet is that illicit files, such as music, video and software, all have one common attribute—they are very large once reassembled. It is therefore necessary to (i) identify oversized files that have been uploaded in parts, and (ii) identify "hidden" files that are appended to otherwise legitimate files. As will be further described below, an aspect of the present invention takes advantage of these characteristics of the Internet.

Figure 2A:
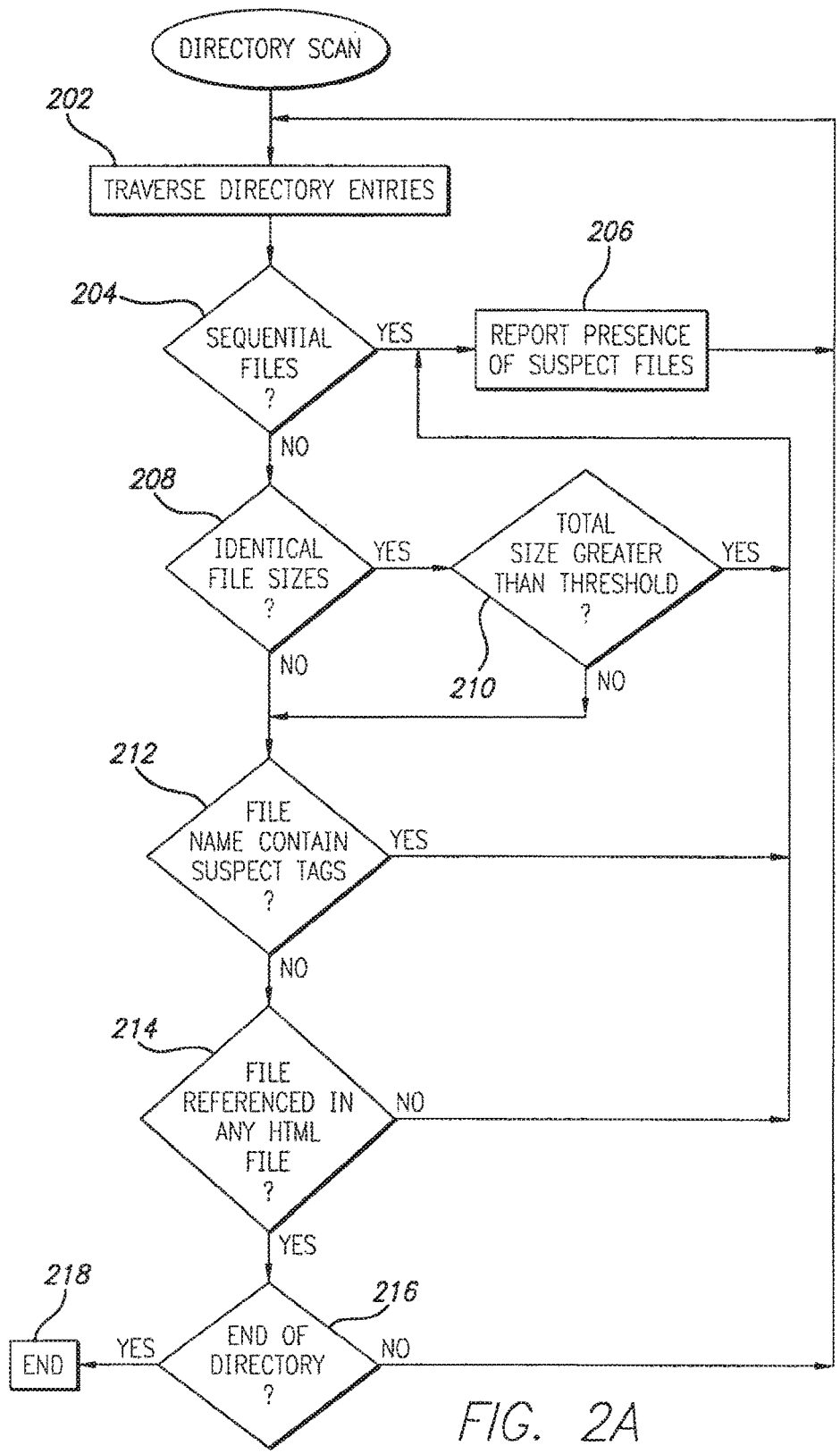
FIG. 2A is a flow chart illustrating a method of scanning a file directory to identify suspect files stored in a database in accordance with an embodiment of the invention.
Figure 2B:
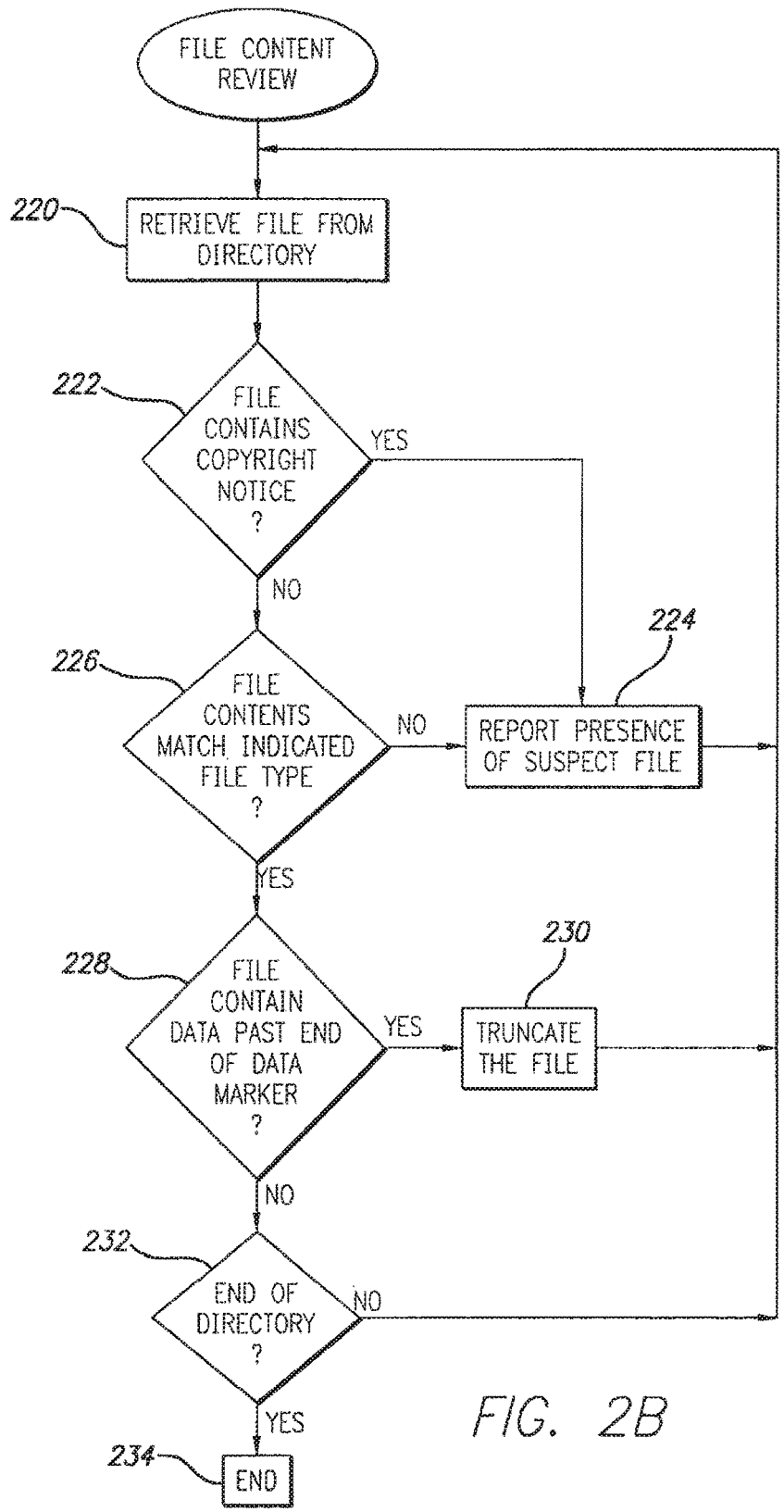
FIG. 2B is a flow chart illustrating a method of reviewing file contents to identify suspect files.
Figure 2C:
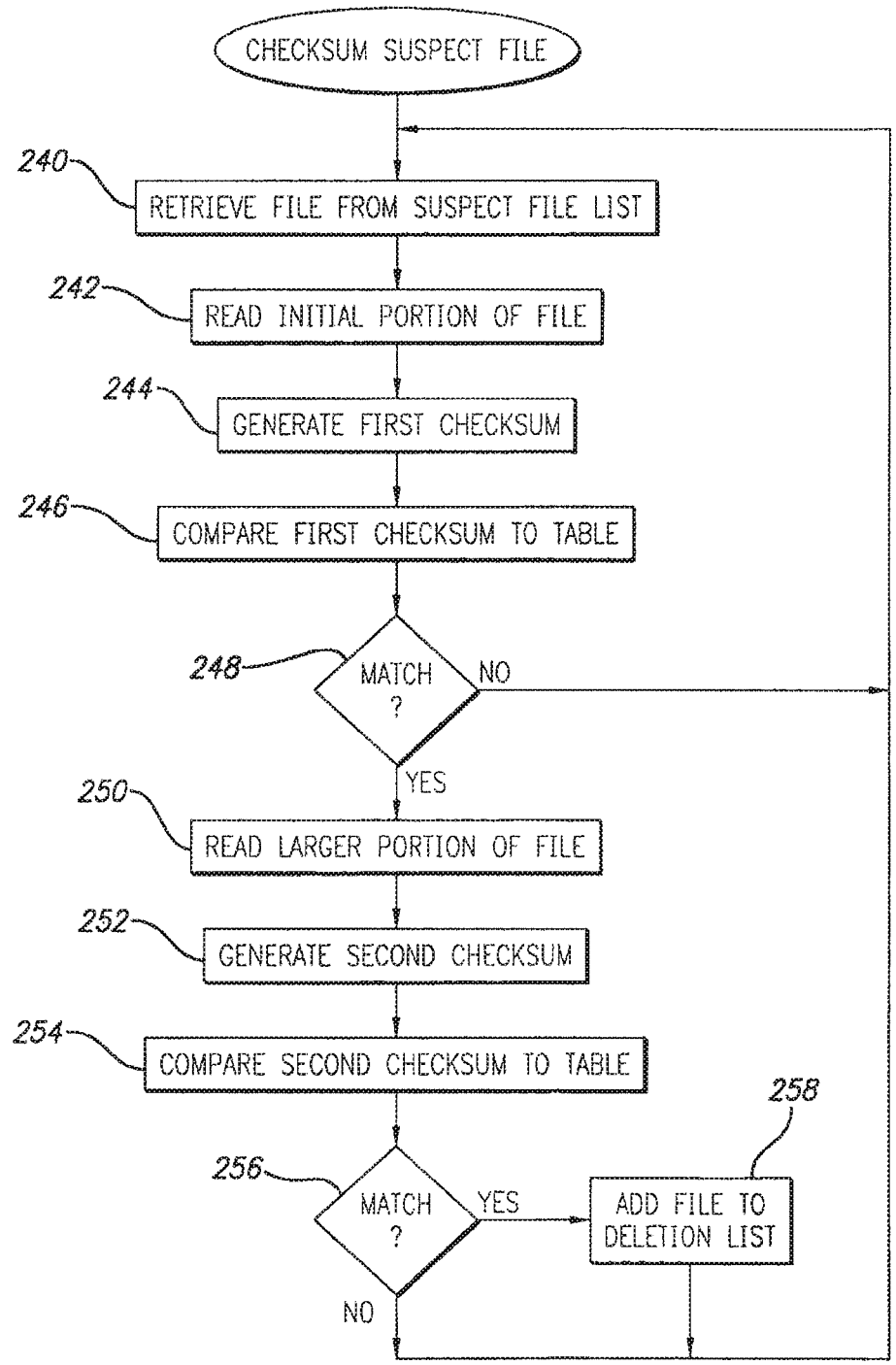
FIG. 2C is a flow chart illustrating a method of checksumming the suspect files.

Referring now to FIGS. 2A-2C, a method for identifying and characterizing files is illustrated in accordance with an embodiment of the invention. The method would be executed by the file identification application 114 described above with respect to FIG. 1. FIG. 2A illustrates an exemplary method of scanning a file directory to identify suspect files stored in a database. Suspect files are ones that are suspected of being improper, and are marked for further testing. The database 116 includes a directory that identifies the files stored therein based on various attributes, including file name and file size. It will be appreciated from the following discussion that the method of FIGS. 2A-2C relates specifically to the identification of pornographic materials in view of the particular selection criteria that is utilized; however, it will be understood to persons of ordinary skill in the art that the selection criteria can be modified to identify other types of illicit files. Starting at step 202, the application traverses the directory in order to analyze the numerous directory entries. The application may construct a relational database of the directory entries in order to sort on the various fields of the directory. This step may be performed repeatedly as a continuing process through this identifying process, and would have to be repeated periodically to identify new files that are added to the database 116.

At step 204, the application determines whether there are any sequentially numbered files within the directory. Sequential files can be identified by analyzing and comparing the file names to each other. One attribute of pornographic materials is that they are often uploaded to a server as part of a series of photographs. Thus, the file names may include an embedded numerical designation such as "xxx001.jpg" or "xxx002.jpg". The user may define at what level of folders the software will look for sequentially numbered, lettered, or otherwise identified files. For example, if a file server is divided into folders lettered from "AA" to "ZZ", and each folder contains Web sites with names in which the first two letters correspond to the name of the file folder, the user could decide to treat all folders on the server as a single Web site, or to treat only Web sites within the same folder as a single Web site, or to treat each Web site individually. In the preferred embodiment, each Web site is considered on its own without reference to other Web sites, although the invention need not be limited in this manner.

If any such sequential files are identified, they are reported as suspect files at step 206. Then, the application returns to step 202 and continues traversing through the directory entries. If no sequential files are identified at step 204, the application next determines at step 208 whether there are any files having identical file sizes. Another attribute of stolen intellectual property materials such as music files is that they are often broken up into several pieces in order to thwart their detection by simple searches for large files, and also to enable them to be downloaded or uploaded in smaller chunks to facilitate transfer. The presence of two or more files having identical file size within the directory is an indicator that they may be pieces of a single, larger, illicit file. If there are plural files with identical file sizes, the application determines at step 210 whether the total size of the identical files summed together would exceed a predetermined threshold. As noted above, illicit files tend to be unusually large, so the predetermined threshold would be selected to correspond with the largest size of a typical non-illicit file. If the total size does exceed the predetermined threshold, then the identical files are reported as suspect files at step 206.

More particularly, the application may manipulate the file names to determine whether they are in fact likely to be parts of a single, larger file. An alternative way to determine whether files should be aggregated is to delete all numbers from the file names. Any files that are identically named after the elimination of all numbers would be marked as potentially responsive and their names and aggregate size would be reported. Of course, this can be limited to numbers in conjunction with specified letters (such as r00 r41, etc., as the "r" denotation often indicates file compression and division via the RAR method). Similarly, this can be limited to specified file types (whether identified by the file type suffix to the file name, or by examination of the actual contents of the file) or files other than specified types (for example, legitimate graphics files such as *.jpg are often sequentially numbered and may be a good candidate for exclusion). Next, using the original list of file names, any files are identified that differ only by a user-defined number of characters. Such files would be marked as potentially responsive and their names and aggregate size would be reported. Both of the foregoing methods can be set to either ignore the file suffix or file type information or to utilize it. Next, using the original list of file names and sizes, files that are of the same size (or within a user-defined number of bytes of being of the same size) are identified. Any such files are marked as potentially responsive and their names and aggregate size would be reported.

If no identical files are identified at step 208, or if the total size does not exceed the predetermined threshold at step 210, the application proceeds to step 212 where it is determined whether the file names contain any suspect tags. An example of a suspect tag is "xxx" which is often used in association with pornographic materials. Another example of a suspect tag is "crc" which refers to a cyclical redundancy check (CRC), i.e., a known error checking technique used to ensure the accuracy of transmitting digital data. When a large file has been broken up into plural smaller files, it is common to include a CRC file in order verify the accurate reconstruction of the large file. The presence of a file having a "crc" tag is an indicator that an illicit or illegal file has been uploaded to the server. A table of predetermined suspect tags may be generated and periodically updated to reflect current usage within Internet newsgroups, Web sites and other facilities for trafficking in pornographic or illicit materials. If any file names containing suspect tags are identified, then the associated files are reported as suspect files at step 206.

If no suspect tags are identified at step 212, the application proceeds to step 214 where it is determined whether the file is referenced in any HTML file contained within the directory. Ideally, the files stored on the database would each be linked to HTML files contained within the director. Where a file is not linked to a local HTML file, this is an indicator that a user is storing graphics or other non-text files that are linked to a Web page hosted elsewhere on a different service. As described above, this situation is undesirable since the free web hosting service pays the storage and bandwidth costs for these files without deriving the revenue from advertisement displays. Accordingly, any file names that are not referenced in an HTML file contained within the directory are reported as suspect files at step 206. Alternatively, every file bearing a file type capable of causing a web browser to generate hypertext links (i.e. *.htm, *.html, *.shtml, etc.) may also be reviewed. The hypertext links may be then compared against a list of illegal links (for example, links to adult-content Web sites). Any file that contains a hypertext link to such a site is reported as suspect. If all files on the directory are properly referenced in HTML files or contain no illegal links, the application determines whether the end of the directory has been reached at step 216. If the end of the directory is not yet reached, the application returns to step 202 to continue traversing the directory and identifying suspect files. Otherwise, this portion of the application ends at step 218.

Once a review of the directory entries is complete, the next step is to review the content of the files listed on the directory to see if additional files should be added to the suspect file list. This review may address every file listed on the directory not already listed on the suspect file list, or may be further narrowed using particular selection criteria specific to the type of illicit file, i.e., pornography, copyright infringement, etc. FIG. 2B illustrates an exemplary method of reviewing file contents. At step 220, the application retrieves a file from the directory. At step 222, the retrieved file is examined to identify whether the file contains a copyright notice or the symbol ©. The presence of a copyright notice in the file is an indicator that the file has been uploaded to the server unlawfully, and likely contains graphics, text, software or other material that is protected by copyright. Any files containing the copyright notice would be reported as a suspect file and added to the suspect file list at step 224. This copyright notice check procedure can also be used to ensure compliance with appropriate copyright laws. Alternatively, the file can be simply marked for deletion. The application then returns to step 220 and retrieves the next file.

If the file does not contain a copyright notice, the application passes to step 226, in which the retrieved file is examined to determine whether the file structure is as expected for a file of the indicated type. For example, the file type "jpg" should contain a header structure with the values "255 216 255 224". Alternatively, files can be checked to ensure that they actually contain the type of data described by the file type marker (i.e., a file named *.jpg should contain a jpg image). If the file does not match the indicated file type, the file can be reported as a suspect file and added to the suspect file list at step 224, or simply marked for deletion. Another alternative approach would be to replace files containing data of a type different than that indicated by their file type marker by a file stating that the original file was corrupted. Yet another approach would be to retype the file (i.e. *.jpg can be retyped to *.zip if it contained a zipped file and not a jpg). Further, certain file types can be aggregated. For example, *.gif and *.jpg files may be aggregated as a single file type, and a file bearing a *.jpg type is considered valid if it contains either a gif or a jpg image. This greatly reduces the problem of mistakenly deleting a file that a consumer has innocently misnamed. The application then returns to step 220 and retrieves the next file.

If the file contents do match the indicated file type, the application determines at step 228 whether the file contains data extending past the end of data marker. If this marker appears before the true end of file, then it is likely that the additional data following the end of data marker constitutes a portion of an illicit file. At step 230, the file is truncated at the end of file marker. The application then returns to step 220 and retrieves the next file. If the file does not contain data past the end of data marker, the application proceeds to step 232 in which it is determined whether the end of the directory has been reached. If there are still additional files in the directory to review, the application returns to step 220 and retrieves the next file. If there are no additional files, the file content review process ends at step 234.

After the files within the directory have been reviewed and a list of suspect files generated, the next step is to checksum the suspect files and compare the results against a library of checksum values corresponding to known illicit files. The generation of this list of known illicit files will be described below with respect to FIG. 4. FIG. 2C illustrates an exemplary method of checksumming the suspect files. A checksum is a unique number based upon a range or ranges of bytes in a file. Unlike checksums as they are traditionally used in the computing field, the checksum described herein is not related to the total number of bytes used to generate the number, thus reducing a traditional problem with checksums, namely that similar file lengths are more likely to generate the same checksum than are dissimilar file lengths. In a preferred embodiment of the invention, two separate checksums are generated for a file corresponding to two different length portions of the file. While it is possible that the first checksum based on a shorter length portion of the file may falsely match the checksum of another file, it is highly unlikely that the second checksum would result in a false match. In addition, the use of an initial checksum based upon a small amount of data reduces the burden on the network and file server. This reduction is a result of the ability to disqualify a file that does not match the first checksum without the need to read the larger amount of data necessary to generate the second checksum.

More particularly, at step 240, the application retrieves a file from the database identified on the suspect file list. Then, at step 242, the application reads a first portion of the suspect file. In an embodiment of the invention, the first portion comprises the first one-thousand (1,024) bytes of the file. A first checksum based on this first portion is generated at step 244. The first checksum is then compared to a library of known checksum values at step 246, and at step 248 it is determined whether there is a match between the first checksum and the library. This step provides an initial screen of a file. If there is no match, then the file likely does not correspond to a known illicit file. The file may nevertheless constitute improper or unlawful material, and it may therefore be advisable to manually review the file to evaluate its contents. If the file does contain improper or unlawful material, its checksum may be added to the library of known checksums and the file marked for deletion from the database. Conversely, if the manual review does not reveal the file to be improper or unlawful, or based simply on the negative result of the first checksum comparison, the file is removed from the suspect file list, and the application returns to step 240 to retrieve the next file from the suspect file list.

If there is a match based on the initial screen of the file, the application proceeds to step 250 in which a second portion of the file is read. In an embodiment of the invention, the second portion comprises the first ten-thousand (10,240) bytes of the file. A second checksum based on this second portion is generated at step 252. The second checksum is then compared to a library of known checksum values at step 254, and at step 256 it is determined whether there is a match between the second checksum and the library. This step provides a more conclusive determination as to whether the file corresponds to a known improper or unlawful file. If there is a match, the file is marked for deletion (or other treatment) at step 258, and the application returns to step 240 to retrieve the next suspect file. If there is not a match, the file is removed from the suspect file list, and the application again returns to step 240 to retrieve the next suspect file.

The files that are marked for deletion may be listed along with the pertinent information in a database (either via numerous individual files, an actual database such as SQL Server, or otherwise). This database may be manually reviewed and files that should not be deleted removed from the database. A simple file deletion program may then be run that deletes any file in the database.

As noted above, the first one-thousand bytes and the first ten-thousand bytes are used for the two checksums, respectively. For most applications, the use of the entire file or a larger portion of the file is not necessary and indeed may slow the process; however, there is no reason why the entire file or any other subset of the file could not be used. In an alternative embodiment, the first and last portions of the file are used for checksumming, although premature file truncation then becomes a way to defeat the screen. It is also possible to use other data to improve the quality of the initial screen, such as the length of the file and the file name. Any file matching the initial screen criteria is then checked against one or more checksum tests. Yet another alternative embodiment is to simultaneously generate both the initial screen checksum and the confirmation checksum in a single file read, thereby reducing the number of distinct disk access events. Verification is optional when the initial screen is performed using a checksum, as the checksum denotes a nearly certain match.

In an alternative embodiment of the invention, the present method for identifying and characterizing files can be used to block music piracy on the Internet. Each music CD carries certain identifying data that permits unique identification of that CD. MP3 encoders can be configured to encode this information into the first bytes of each MP3 file. As such, the MP3 file would carry the signature of the music CD it was created from. This would permit a scan of all files on a server for the signature code of a particular CD. When such a code is found, it can be checked against a database of copyrighted music and any matches marked for deletion and/or review. An alternative embodiment would be to prevent MP3 players from working properly unless the unique identifier from a CD is found, and that unique identifier can be checked for validity against a checksum or an Internet database.

Figure 3:
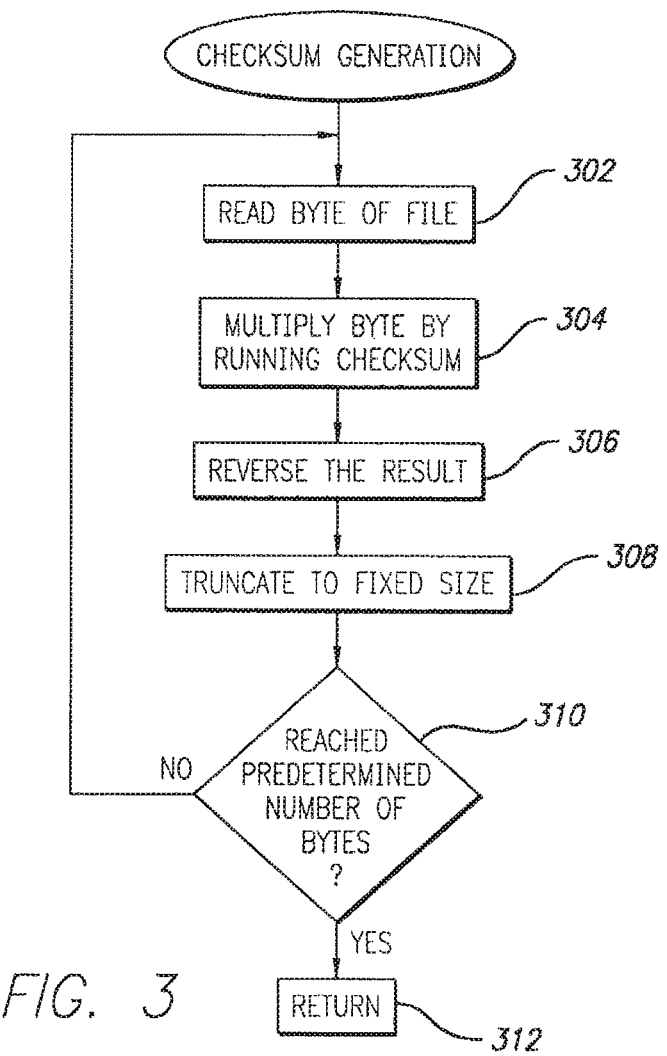
FIG. 3 is a flow chart illustrating a method of generating checksum values.

There are numerous possible algorithms that may be utilized to generate a checksum, with an exemplary algorithm shown in FIG. 3. At step 302, a single byte of the file is read. The byte is then multiplied by the current value of the checksum at step 304. On the first pass through the algorithm, a value of one is used for the current value of the checksum. Next, at step 306, the result of the previous step is reversed (e.g., 1234 becomes 4321). At step 308, the result of the previous step is truncated to a predetermined number of digits (e.g., with the predetermined number of digits being nine, 1,234,567,890 becomes 123,456,789). At step 310, the algorithm determines whether the predetermined number of bytes has been reached. As described above, checksums are performed using the first one-thousand (1,024) and ten-thousand (10,240) bytes in accordance with a preferred embodiment of the invention. If the predetermined number of bytes has not been reached, the algorithm returns to step 302 and continues with the next byte. Conversely, if the predetermined number of bytes has been reached, the algorithm-ends at step 312. An advantage of this algorithm is that the checksum that is generated is independent of the number of bytes that are utilized. This way, the likelihood of false matches is substantially reduced even though the same number of bytes are used to calculate the checksums.

It should be appreciated to persons having ordinary skill in the art the many other types of algorithms could be utilized to achieve results specific to certain types of files. In an alternative embodiment of the invention, checksums of graphics files may be generated based on vector graphics analysis of the files. The graphics file may be reduced to its vector graphics components. The resulting vector graphics image is then reduced to a checksum representing the vector graphics image. The checksum is then checked against a list of checksums generated in a similar matter against known or suspected inappropriate images.

An alternative method of generating a unique checksum for a graphics file is by dividing an image into quadrants or other blocks and comparing the relationships between the zones into which the image is divided. For example, the relative ratio, of red to green, green to blue, and blue to red in each of the zones may be calculated, and then recorded. A file could then be altered in a minor way (such as by altering several bits) without defeating the ability of the software to find the file.

Figure 4:
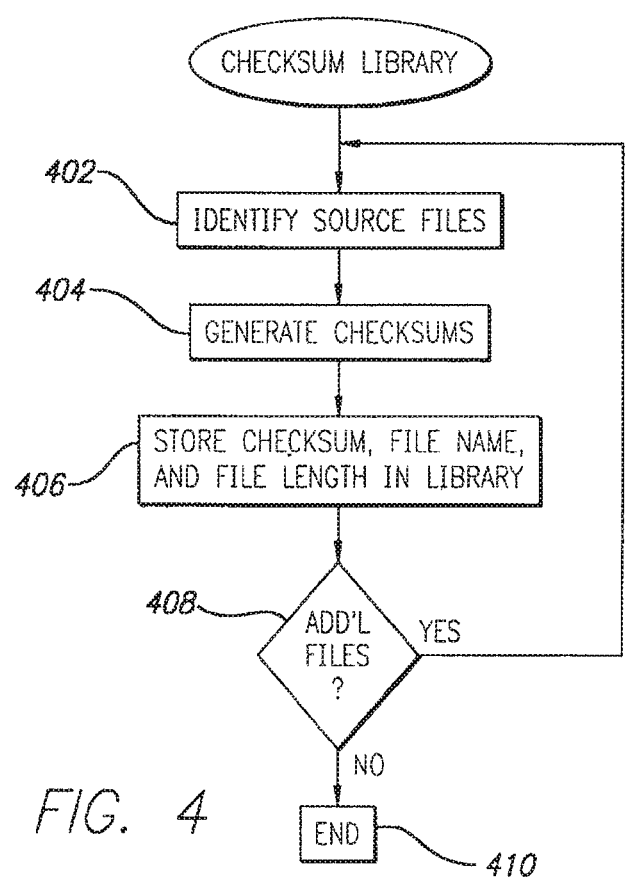
FIG. 4 is a flow chart illustrating a method of generating a checksum library.

Referring now to FIG. 4, an exemplary process is illustrated for generating the library of checksum values. At step 402, a source of known illicit files is identified. This may be performed by manually reviewing files already stored on the database 116 of the Web host 110, such as the files identified as suspect (see FIGS. 2A-2B). Alternatively, sources of illicit files outside of the Web host 110 may be sought, such as located on a secondary Web host 130. Certain Web servers may be assumed to contain files matching the criteria (i.e. a Web host that accepts adult content and runs adult oriented ads over that content will contain nearly entirely adult material). Alternatively, a target newsgroup (e.g., alt.binaries.pictures.erotica.female) can provide a source of illicit files. Once an adequate source of files is identified, checksum values are generated at step 404 in the same manner as described above with respect to FIG. 3. Then, at step 406, the checksum is stored in a library along with the file name and file length. Lastly, at step 408, it is determined whether there are other files associated with the identified source of files that can be checksummed in order to further enlarge the library. As will be further described below, the identification of a single source of illicit material will invariably lead to other sources of material. Thus, the library can be expanded at an exponential rate. The process of FIG. 4 is repeated for each new source of illicit material. If no additional source files can be located, the process terminates at step 410.

Once a single file is located matching a predefined criteria adult content), it is almost certain that other files also matching the same criteria will be found together with or in proximity to the original matching file (e.g., a Web site having one pornographic photograph will likely contain others with it). All files located with the matching file can be automatically checksummed, or can be checksummed after a manual review. Thus, the library of checksums is expanded. In view of the nature and prevalence of illicit material on the Internet, it is also likely that the matching files will also appear on other Web sites, and will thus lead to other files meeting the selection criteria that can themselves be checksummed. The expansion of the checksum library is thus exponential, and nearly the entire body of illicit materials on the Internet can be checksummed in this manner. This checksum amplification method in the automated checksummed file appear together with a minimum number of other checksummed files on a minimum number of Web sites before the file represented by the checksum is considered to match the selection criteria.

It should be appreciated that one cannot defeat the present invention by simply altering an illicit image file. Although the alteration of an image file may prevent it from matching an existing checksum, the altered image will invariably be copied and posted on a new Web site together with unaltered, checksummed images, and will be inevitably checksummed using the foregoing process. Furthermore, the process can be modified so as to allow automated checksumming with a greatly reduced risk of the generation of checksums for files that do not match the selection criteria. One approach is to set a file size floor and ceiling and/or file type limitation. Another approach is to create and maintain a list of excluded files, including all publicly available "clip art" and popular mainstream advertising banners, as well as files that show up frequently on legitimate Web sites. Yet another alternative approach is to require an image to appear in proximity to known illicit files, such as files that match existing checksums, a minimum number of times before being added to the checksum library.

Furthermore, certain graphics are quite common in certain types of Web sites. For example, pornographic Web sites almost always contain a "banner" advertising membership in a commercial pornography Web site. There is a very limited universe of such banners. By generating checksums for all available pornographic banners, it is possible to locate nearly all pornographic web sites. Using the checksum amplification method described above, these advertising banner checksums would quickly lead to a very comprehensive catalog of pornographic material checksums. Similarly, illegally copied software sites often have "warez" banners. Other target file types have banners and common graphics associated with them as well.

Files matching the selection criteria can also be located by searching for hyperlinks to checksummed files or to sites known to contain inappropriate material. Thus, whenever a checksum is matched, the URL of the material located is recorded. Any HTML page that links to that material is then identified as likely containing material matching the selection criteria. All other graphics referenced by that HTML page and/or in the same Web site may then be automatically checksummed or flagged for manual review and checksumming.

Certain key words may also be searched for on a Web site. Thus, for example, the word "fuck" in close association with "lolita" should flag a site as likely to contain child pornography. This method is better used in conjunction with a manual review so as to avoid checksumming files that do not match the selection criteria, although it can also be used as an enhancement to the checksum amplification method to confirm that checksums should be automatically generated.

The results of these searches can be returned in a regular text file. Alternatively, the results may be returned in a formatted HTML file that interconnects with the file management system. The HTML file should display a copy of all files on a given Web site matching the checksum(s), all user information as well as other sites using the same password, with the same user name, with the same IP address, or the same email address, and the options to delete the site(s), modify the records, delete the materials, etc. Furthermore, for those file types that cannot be graphically displayed by a Web browser, the "server" modality (see code attached as Exhibit) should be used to return a "file present" or "file absent" graphic to indicate whether the file is present or absent.

In an alternative embodiment of the invention, the present method for identifying and characterizing files may be implemented in a real-time manner to review files as they are uploaded to the Web server. In yet another embodiment of the invention, the present method for identifying and characterizing files may be used to check the contents of desktop computers within a business. Thus, for example, with file and access permissions set correctly, the software could determine whether pornography, child pornography, copyrighted software, or other problematic materials exist on the computers used by employees. Appropriate reporting could then be accomplished. This can also be accomplished by running the software in a standalone package on desktop computers (by parents, for example). For file systems that require locally running software, the software can also be combined with necessary software (for example, the detection software could also serve as the e-mail program for the user, or as the mechanism whereby the user logs into their main server).

An important advantage of the use of checksums to identify and characterize illicit files is that the customer service employees of a Web hosting company can determine with certainty that a file contains illegal contents without actually viewing the file. This is particularly important in retaining employees, as many individuals can become uncomfortable or disturbed by having to view illicit, violent or illegal images. For example, by having a library of child pornography checksums, the computer can simply report "child porn found", and no employee need ever see the image. The customer service employees can then load the illegal file onto a disk to deliver to law enforcement, and terminate the customer account. Another advantage of using the checksums is that it eliminates the need for the Web hosting company to maintain copies of illegal or contraband files in order to verify that files match them. Thus, it is unnecessary to keep a copy of an illegal picture or stolen music file in order to check whether files found on the server match the illicit files.

Lastly, the present method for identifying and characterizing files could be used to provide automatic notification to Web host customers and other interested parties. Any time a file is reported as illegal, a database containing a list of customer data may be accessed to obtain the e-mail address of the site operator. An automated e-mail message may be generated (optionally copied to the Web hosting company's staff) indicating that the site has been marked for review and/or deletion. Alternatively, the fax number of the customer may be accessed and the same message sent via fax. Alternatively, the phone number may be accessed and a text-to-voice system used to send an automated telephone message. Alternatively, postal mail may be printed with the customer's address and the same message.

Having thus described a preferred embodiment of a method and apparatus for identifying and characterizing errant electronic files, it should be apparent to those skilled in the art that certain advantages have been achieved. It should also be appreciated that various modifications, adaptations, and alternative embodiments thereof may be made within the scope and spirit of the present invention. The invention is further defined by the following claims.

What is claimed is:

1. A computer-implemented method for generating a library of checksum values, the method comprising:
    under control of one or more configured computer systems:
        storing, in a computer storage medium, a checksum library for assessing suspect files;
        identifying a source of known illicit files;
        accessing a candidate file stored by a physical storage device for the source;
        determining that the candidate file appears within proximity of a minimum threshold number of the known illicit files for the source;
        generating a candidate checksum for the candidate file stored by the physical storage device for the source, wherein the known illicit files do not include the candidate file;
        determining that the checksum library does not include the candidate checksum; and adding the candidate checksum to the checksum library stored in the computer storage medium.

2. The computer-implemented method of claim 1, further comprising:
receiving a criterion identifying a file characteristic; and
identifying the source of known illicit files using the criterion.

3. The computer-implemented method of claim 2, wherein receiving the criterion comprises receiving at least one of:
a minimum file size; and
a file type.

4. The computer-implemented method of claim 1, wherein the candidate file comprises a graphics file, and wherein generating the candidate checksum comprises at least one of:
generating the candidate checksum for the graphics file based on vector graphics analysis; or
dividing the graphics file into blocks and comparing relationships between the blocks.

5. The computer-implemented method of claim 1, wherein adding the candidate checksum to the checksum library comprises:
associating a file name of the candidate file with the candidate checksum; and
associating a file length of the candidate file with the candidate checksum.

6. The computer-implemented method of claim 1, wherein:
generating the candidate checksum for the candidate file comprises:
generating a first checksum of the candidate file using a first number of bytes from a first file location of the candidate file, and
generating a second checksum of the candidate file using a second number of byes from a second file location of the candidate file; and
wherein adding the candidate checksum to the checksum library comprises adding the first checksum and the second checksum to the checksum library.

7. The computer-implemented method of claim 1, wherein accessing the candidate file of the source comprises establishing a network connection with at least one of a web server or a newsgroup server.

8. The computer-implemented method of claim 1, wherein accessing the candidate file of the source comprises:
accessing a first directory of the source, the first directory including the candidate file; and
wherein determining that the candidate file appears within the proximity of a minimum threshold number of the known illicit files for the source is based on a second directory of the source, the second directory including the known illicit files, wherein the first directory is a different location than the second directory.

9. The computer-implemented method of claim 1, further comprising:
obtaining a suspect file from a second file source;
generating a checksum for the suspect file;
determining the checksum for the suspect file corresponds to the candidate checksum in the checksum library; and
characterizing the suspect file as an unauthorized file.

10. A computer system, comprising:
a computer storage device configured to store a checksum library for assessing suspect files;
a server adapted to be connected to a network to permit retrieval of files from a file source; and a file identification application operative with the server to generate the checksum library, the file identification application providing the functions of:
identifying the file source as a source of known illicit files;
accessing a candidate file stored by a physical storage device for the file source;
determining that the candidate file appears within proximity of a minimum threshold number of the known illicit files for the source;
generating a candidate checksum for the candidate file from the file source, wherein the known illicit files do not include the candidate file;
determining that the checksum library does not include the candidate checksum; and
adding the candidate checksum to the checksum library stored in the computer storage device.

11. The computer system of claim 10, wherein the file identification application further provides the functions of:
receiving a criterion identifying a file characteristic; and
identifying the source of known illicit files for processing using the criterion.

12. The computer system of claim 11, wherein the file identification application receiving the criterion comprises the file identification application receiving at least one of:
a minimum file size; and
a file type.

13. The computer system of claim 10, wherein the candidate file comprises a graphics file, and wherein the file identification application generating the candidate checksum comprises the file identification application providing at least one of the functions of:
generating the candidate checksum for the graphics file based on vector graphics analysis; or
dividing the graphics file into blocks and comparing relationships between the blocks.

14. The computer system of claim 10, wherein the file identification application adding the candidate checksum to the checksum library comprises the file identification application providing the functions of:
associating a file name of the candidate file with the candidate checksum; and
associating a file length of the candidate file with the candidate checksum.

15. The computer system of claim 10, wherein:
the file identification application generating the candidate checksum comprises the file identification application providing the functions of:
generating a first checksum of the candidate file using a first number of bytes from a first file location of the candidate file, and
generating a second checksum of the candidate file using a second number of byes from a second file location of the candidate file; and
wherein adding the candidate checksum to the checksum library comprises adding the first checksum and the second checksum to the checksum library.

16. The computer system of claim 10, wherein the server is adapted to establish a connection via the network with the file source, wherein the file source comprises at least one of a web server or a newsgroup server.

17. The computer system of claim 10, wherein the server is adapted to access the candidate file from the file source by:
accessing a first directory of the file source, the first directory including the candidate file; and
wherein determining that the candidate file appears within the proximity of a minimum threshold number of the known illicit files for the source is based on a second directory of the file source, the second directory including the known illicit files, wherein the first directory is a different location than the second directory.

18. The computer system of claim 10, wherein the server is further adapted to obtain a suspect file from a second file source, and wherein the file identification application is further adapted for providing the functions of:
- generating a checksum for the suspect file;
- determining the checksum for the suspect file corresponds to the candidate checksum in the checksum library; and
- characterizing the suspect file as an unauthorized file.

19. A physical storage device having instructions stored thereon, the instructions comprising:
- instructions for storing, in a computer storage medium, a checksum library for assessing suspect files;
- instructions for identifying a source of known illicit files;
- instructions for accessing a candidate file stored by a physical storage device for the source;
- instructions for determining that the candidate file appears within proximity of a minimum threshold number of the known illicit files for the source;
- instructions for generating a candidate checksum for the candidate file stored by the physical storage device for the source, wherein the known illicit files do not include the candidate file;
- instructions for determining that the checksum library does not include the candidate checksum; and
- instructions for adding the candidate checksum to the checksum library stored in the computer storage medium.

* * * * *